(No Model.)
E. O. GOSS.
LUBRICATOR.
No. 603,686.   Patented May 10, 1898.
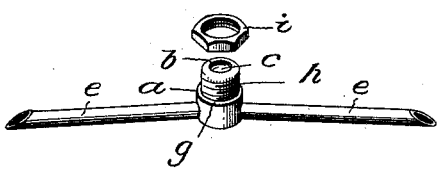
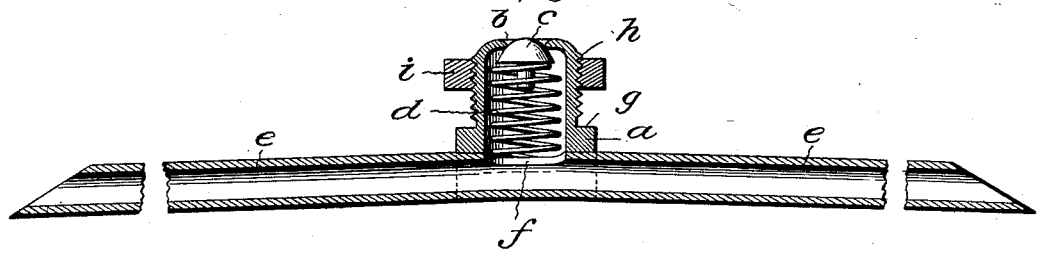
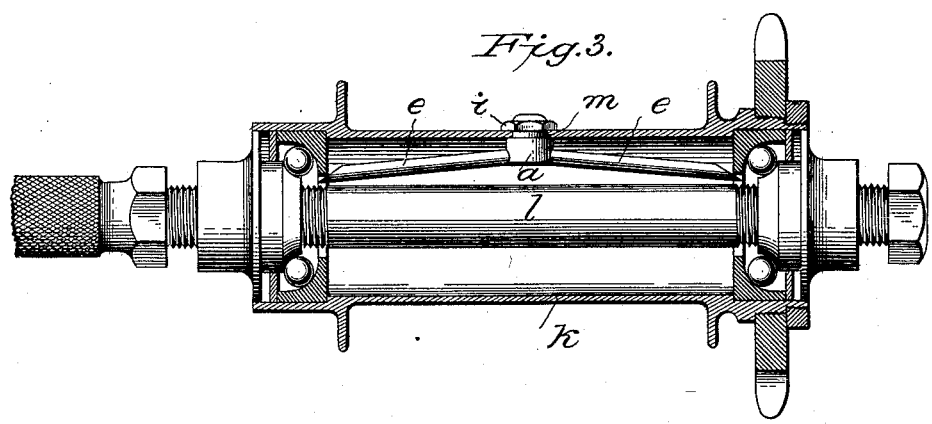
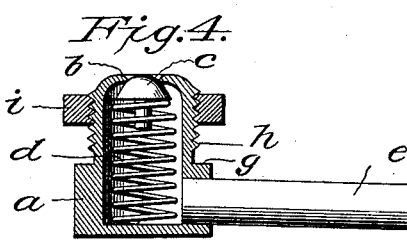
WITNESSES
L. S. Elliott
E. A. Finckel
INVENTOR
Edward O. Goss,
by Wm. N. Finckel.
Attorney.

UNITED STATES PATENT OFFICE.

EDWARD O. GOSS, OF WATERBURY, CONNECTICUT, ASSIGNOR TO THE SCOVILL MANUFACTURING COMPANY, OF SAME PLACE.

LUBRICATOR.

SPECIFICATION forming part of Letters Patent No. 603,686, dated May 10, 1898.

Application filed December 13, 1897. Serial No. 661,635. (No model.)

*To all whom it may concern:*

Be it known that I, EDWARD O. GOSS, a citizen of the United States, residing at Waterbury, in the county of New Haven and State of Connecticut, have invented a certain new and useful Improvement in Lubricators, of which the following is a full, clear, and exact description.

The object of this invention is to provide a lubricator for use especially in that class of bearings which are made as near dust and dirt tight as possible, although the invention is applicable to bearings generally, journal-boxes, and other machinery and parts of machinery requiring lubrication.

Prior to my invention a lubricator has been constructed in which is employed an oil-cup the inlet to which is normally closed by a spring-valve, said inlet being accessible from outside the device to which the lubricator is applied for the purpose of supplying lubricant thereto, and such oil-cup has been provided with a tube or tubes or has been erected in connection with other means for conveying the oil in the cup to a distant point or points to be lubricated. It is to this class of lubricators which my invention relates.

The invention consists of a lubricator comprising an integral oil-cup having its inlet normally closed by a spring-valve and carrying a duct or ducts, preferably in the form of a tube or tubes, for conveying away the lubricant, and having an external shoulder by which it may be abutted against a wall or portion of the body to which it is applied, and also having an external screw-thread above such shoulder to receive a nut, by means of which the device is secured in position, all as I will proceed now more particularly to set forth and finally claim.

In the accompanying drawings, illustrating my invention, in the several figures of which like parts are similarly designated, Figure 1 is a perspective view. Fig. 2 is a longitudinal section enlarged. Fig. 3 shows an application of my invention to the hub of the rear wheel of a bicycle. Fig. 4 is a longitudinal section of a modification.

The oil-cup or body $a$ of my lubricator may be made of metal tubing or a casting, or otherwise, with its lower end closed and its upper end provided with an inlet $b$ for the introduction of the lubricant. Within the oil-cup is arranged a valve $c$, which by means of a coiled or other spring $d$ is normally seated in the inlet $b$, so as to close said inlet against the incoming of dust or dirt and the influence of the elements. This spring and valve may be introduced into the oil-cup in any of a variety of ways—as, for example, by having the open end of the tube in line with its walls and then, after the spring and valve are arranged within the tube, bending or spinning down the walls of such open end in substantially the form shown in the drawings.

As shown in Figs. 1, 2, and 3, where the lubricator is to be used for supplying lubricant to a pair of bearings a tube $e$ is united with the cup $a$ by soldering or otherwise, securing the same in a recess or recesses in the cup $a$ and providing an opening $f$ from the the cup into the said tube. As shown in Fig. 4, the tube or duct extends from one side of the cup only, the same being lettered $e'$.

A shoulder $g$ is made on the outside of the cup, leaving the upper portion of the cup of reduced diameter, and such reduced-diameter portion is provided with an external screw-thread $h$. A nut $i$ is applied to this screw-thread as a means for clamping the lubricator in position.

In illustration of one application of my invention I have shown in Fig. 3 an ordinary barrel-hub $k$, having the ball-bearings at opposite ends encircling the spindle or shank $l$. In order to lubricate such bearings with my lubricator, I provide a hole $m$ in said hub and introduce the reduced end of said lubricator outwardly through such hole and then apply the nut $i$ on the screw-thread $h$ outside of the hub until the shoulder $g$ is drawn up against the inner surface of the hub. In this way the lubricator is securely and quickly applied and is firmly held in position.

In a prior invention the tubes have been applied to a cup arranged within the hub, and this cup has been internally screw-threaded, but does not project through the opening in the hub. An outer cup containing a spring-valve and externally screw-threaded has been introduced from outside of the hub into this inner cup, and such outer cup has been provided with a laterally-extended flange, which abuts against the outside of the hub to hold the cups in place. My invention differs from that described in that its oil-cup is made integral instead of in two parts, and it has a projection which extends through the opening in the hub, and thereby enables the operator readily to put it in position. It is thus capable of being manufactured and sold at comparatively low cost and is capable also of being applied with great facility.

I wish to be understood as not limiting my invention to the kind, construction, or location of the duct or ducts shown, as it is obvious that it or they will be conformable to the object on which the lubricator is used. Neither do I limit my invention to any particular manner of applying the duct or ducts to the oil-cup.

What I claim is—

1. A lubricator, comprising an integral oil-cup, having one or more projecting ducts, a normally-closed valve, and an external screw-thread, said cup being adapted to be projected through an opening in the body to which it is applied, and a clamping-nut for securing the same in position, substantially as described.

2. A lubricator, comprising an integral valved oil-cup, having an external shoulder, and a projection of reduced diameter, externally screw-threaded and adapted to be projected through an opening in a body to which it is applied, so as to bring its shoulder into contact with the body adjacent to said opening, an externally-applied nut for clamping it in place, and one or more ducts for conveying the lubricant to the desired object or place, substantially as described.

3. A lubricator, for use in a hollow hub or similar object having a hole or opening to receive it, consisting of an oil-cup, having a duct or ducts leading therefrom, an internal, normally-closed valve, an external shoulder, and an externally-screw-threaded projection adapted to guide the operator in applying the lubricator to the hole or opening in the object to which it is applied, and a nut for application to such screw-threaded portion outside of the object to which the lubricator is applied, substantially as described.

In testimony whereof I have hereunto set my hand this 11th day of December, A. D. 1897.

EDWARD O. GOSS.

Witnesses:
W. E. TWINING,
C. M. DE MOTT.